(12) United States Patent
Narasimhan

(10) Patent No.: US 8,780,911 B2
(45) Date of Patent: Jul. 15, 2014

(54) LINK AGGREGATION BASED ON PORT AND PROTOCOL COMBINATION

(75) Inventor: Janardhanan P. Narasimhan, Tamilnadu (IN)

(73) Assignee: Force10 Networks, Inc., San Jose, CA (US)

( * ) Notice: Subject to any disclaimer, the term of this patent is extended or adjusted under 35 U.S.C. 154(b) by 576 days.

(21) Appl. No.: 12/900,435

(22) Filed: Oct. 7, 2010

(65) Prior Publication Data

US 2012/0087372 A1 Apr. 12, 2012
US 2013/0083797 A9 Apr. 4, 2013

Related U.S. Application Data

(60) Provisional application No. 61/249,665, filed on Oct. 8, 2009.

(51) Int. Cl.
*H04L 12/28* (2006.01)

(52) U.S. Cl.
USPC .......................................... 370/392; 370/389

(58) Field of Classification Search
USPC .......................................... 370/389, 392, 401
See application file for complete search history.

(56) References Cited

U.S. PATENT DOCUMENTS

| 6,298,061 | B1 * | 10/2001 | Chin et al. ..................... 370/400 |
| 6,993,026 | B1 * | 1/2006 | Baum et al. ................... 370/392 |
| 7,190,696 | B1 * | 3/2007 | Manur et al. .................. 370/392 |
| 7,317,722 | B2 * | 1/2008 | Aquino et al. ................. 370/390 |
| 7,352,745 | B2 * | 4/2008 | Perera et al. .................. 370/389 |
| 7,505,401 | B2 * | 3/2009 | Kashyap ....................... 370/217 |
| 7,668,081 | B2 * | 2/2010 | Hermsmeyer et al. ........ 370/218 |
| 7,720,066 | B2 * | 5/2010 | Weyman et al. .............. 370/390 |
| 7,760,632 | B2 * | 7/2010 | Yano et al. ................... 370/230.1 |
| 7,869,432 | B1 * | 1/2011 | Mollyn ......................... 370/389 |
| 7,912,091 | B1 * | 3/2011 | Krishnan et al. .............. 370/490 |
| 7,940,700 | B2 * | 5/2011 | Dalberg ....................... 370/256 |
| 7,948,920 | B2 * | 5/2011 | Ghosh et al. ................. 370/254 |
| 7,969,880 | B2 * | 6/2011 | Yano et al. ................... 370/230.1 |
| 8,059,638 | B2 * | 11/2011 | Nam et al. .................... 370/386 |
| 8,077,613 | B2 * | 12/2011 | Bitar ............................ 370/230 |
| 8,089,965 | B2 * | 1/2012 | Mitsumori .................... 370/390 |
| 8,121,051 | B2 * | 2/2012 | McGee et al. ................ 370/254 |
| 8,208,377 | B2 * | 6/2012 | Subramanian et al. ....... 370/230 |
| 8,442,064 | B2 * | 5/2013 | Singla et al. ................. 370/422 |
| 8,462,666 | B2 * | 6/2013 | Subramanian et al. ....... 370/254 |
| 8,649,379 | B2 * | 2/2014 | Subramanian et al. ....... 370/392 |
| 2009/0141731 | A1 * | 6/2009 | Bitar ............................ 370/412 |
| 2010/0226281 | A1 * | 9/2010 | Ghosh et al. ................. 370/254 |
| 2010/0329147 | A1 * | 12/2010 | Nam et al. .................... 370/254 |
| 2011/0085570 | A1 * | 4/2011 | Kotha et al. .................. 370/419 |
| 2012/0182872 | A1 * | 7/2012 | Wakumoto ................... 370/235 |
| 2012/0263187 | A1 * | 10/2012 | Belanger et al. ............. 370/401 |
| 2012/0275297 | A1 * | 11/2012 | Subramanian ............... 370/225 |

* cited by examiner

*Primary Examiner* — Brian O'Connor
(74) *Attorney, Agent, or Firm* — Haynes and Boone, LLP

(57) ABSTRACT

A network switch suitable for receiving packets of information from and the packets of information to a communications network includes a plurality of physical ports, packet processing functionality and memory. The packet processing functionality operates on information stored in memory to determine the LAG, from among two or more LAGs, over which a packet received by the switch should be correctly forwarded. The switch memory stores a plurality of LAG tables, each one of which can include one or more entries comprising a physical port number and a packet parameter that are used by the packet processing functionality to determinately identify the correct LAG over which to forward a packet.

20 Claims, 7 Drawing Sheets

Port 1

| ENTRY # | VLAN ID | LAG ID |
|---|---|---|
| 1 | 10 | 1 |
| 2 | 20 | 2 |

Port 2

| ENTRY # | VLAN ID | LAG ID |
|---|---|---|
| 1 | 20 | 2 |

Port 3

| ENTRY # | VLAN ID | LAG ID |
|---|---|---|
| 1 | 10 | 1 |

Port 5

| ENTRY # | VLAN ID | LAG ID |
|---|---|---|
| 1 | 10 | 1 |
| 2 | 20 | 2 |

Port 6

| ENTRY # | VLAN ID | LAG ID |
|---|---|---|
| 1 | 20 | 2 |

Port 7

| ENTRY # | VLAN ID | LAG ID |
|---|---|---|
| 1 | 10 | 1 |

Fig.7

LINK AGGREGATION BASED ON PORT AND PROTOCOL COMBINATION

CROSS REFERENCE TO RELATED APPLICATIONS

This application claims the benefit under 35 U.S.C. §119(e) of U.S. Provisional Patent Application Ser. No. 61/249,665 entitled "Link Aggregation based on Port and Protocol Combination", filed Oct. 8, 2009, the entire contents of which is incorporated by reference.

FIELD

The invention relates generally to the technical area of routers and switches and specifically to forwarding packets in a deterministic manner, over two or more link aggregation groups, from a logical port on a first network device to a physical port a second network device.

BACKGROUND

Link aggregation is the subject of an IEEE publication 802.3ad which generally describes the bundling of physical or logical ports to form a single logical channel or aggregated link between at least two packet network devices. The aggregation of links is controlled by a Link Aggregation Control Protocol (LACP) which is also described in the IEEE publication 802.3ad. An aggregation of links or link aggregation group (LAG) can be defined to be between two or more devices in communication with each other over two or more network links, and each of the two or more devices must implement the LACP. Generally, a link aggregation group is established between two packet network devices when one device sends LACP packets to another device. These packets include information needed by each network device to set up or terminate an LAG. A LAG can be established between two network devices that have two or more physical or logical network links in common that can be grouped together into a single logical link. Grouping the links into an LAG has the advantage of increasing the bandwidth between the two network devices and also provides for redundancy in the event of a link/port failure in one of the devices. FIG. 1 shows two network devices, device A and B, with a LAG configured between them. In this case, the LAG includes three physical or three logical links L.1, L.2, and L.3, and the three links are aggregated into one logical link labeled LAG 10.

As shown with reference to FIG. 2, it is also possible to configure an LAG between one network device and two other network devices. FIG. 2 shows three network devices, device A, device B and device C. Network device A can be, for instance either a network router or switch and network devices B and C can both be switches or routers or can be servers. Each of the devices B and C are in communication with device A over, in this case, single logical network links L.1 and L.2 respectively. Each of the logical links can represent one or more physical links between device A and devices B and C. In this case, links L.1 and L.2 are aggregated together into a group of links labeled as LAG 20. Due to the manner in which the LAG is established, the two network devices B and C appear to device A as a single logical device.

Typically, network traffic that is forwarding to an aggregation of links is load balanced. That is, the amount of traffic forwarded to each of the physical (or logical) links in an aggregation of links is approximately the same. Load balancing is typically employed to make the most efficient use of the total available LAG bandwidth. Load balancing in relationship to link aggregation is described here with reference to FIG. 3. FIG. 3 is a network diagram showing three servers A, B and C, with each of the servers in communication with a switch 31 over two logical links. Server A is in communication with the switch over links L.1A and L.1B, server B is in communication with the switch over links L.2A and L.2B and server C is in communication with the switch over links L.3A and L.3B. From the perspective of the switch 31, the links L.1B, L2.B and L.3B are aggregated to form LAG 30. The remaining links, L.1A, L.2A and L.3A are logical links not associated with the LAG 30 and can be utilized to support other (non-LAG) network traffic or to support device management functionality. Each of the servers A, B and C can be configured to provide the same service, which for example can be a domain name service (DNS). Load balancing across each of the links included in the LAG 30 can be achieved as described below.

Continuing to refer to FIG. 3, each of the servers (A, B and C), are configured to be dual homed hosts, i.e. each switch has two logical networking interfaces or ports. Each of the interfaces/ports included in the LAG 30 are configured to have the same IP address, which is referred to here as a virtual IP address. In this case these are the ports (P.1B, P.2B and P.3B) associated with links L.1B, L.2B and L.3B included in the LAG 30. The virtual IP address is the external IP address by which this service will be requested by a client (not shown). Each of these ports can be logical ports incorporating two or more physical ports or they can be physical ports. A virtual MAC address is also assigned to each logical or physical port P.1B, P.2B and P.3B, and this MAC address is associated with the virtual IP address (This can be configured or can be discovered using some load balancing algorithm among the servers). The servers (A, B and C) will use the ports associated with the LAG 30 and the virtual IP and MAC address to provide the DNS service to the client devices. The switch 31 operates to balance the distribution of ingress traffic to the three servers, server A, B and C, associated with the virtual MAC address. The other interface/port on each server can be configured with a unique IP address (each of the three non-LAG ports/interfaces have a different IP address), and each port will use the regular MAC address of that interface. This interface will be used to manage and maintain the load balancing service on the three servers and also to communicate with such applications outside.

The group of three aggregated links, labeled LAG 30 in FIG. 3, is perceived by the switch 31 as one logical link, and the switch 31, using load balancing functionality, is able to distribute the flow of traffic through this logical link relatively evenly with respect to the three physical links comprising the LAG. Each of the servers A, B and C use common virtual IP and virtual MAC addresses assigned to their respective ports to communicate with other devices in the network. The load balancing scheme described above with reference to FIG. 3 would be possible with standards based LAG support that is typically included on a switch. Usually the switch distributes incoming IP traffic to the LAG based on some hash mechanism, and the ARP packets are sent to all the ports of the LAG, to ensure that all the servers receive the ARP request and reply packets. However, the standards based approach to LAG does not permit a server port associated with a network device, such the server A in FIG. 3, to be shared/assigned to two or more LAGs. In order to assign one port to two or more LAGs, the port that is assigned to the two or more LAGs needs to be assigned two or more different IP addresses. The result of such a configuration, in the standards based LAG approach, is that a packet coming into a switch with ports configured in this manner cannot be routed to a server port in a determinate manner. In other words, the switch is unable to determine which LAG it should select in order to transmit the packet to the correct server port.

SUMMARY

It was discovered that a packet this packet routing problem can be solved by defining a LAG to be comprised of the identity of a physical port and one or more parameters that can be included in the header of a packet. From another perspective, the combination of the physical port identify and a packet parameter defines the identify of a logical port. Each logical port can be defined to be a member of only one LAG. From another perspective, a single, physical port can be a member of two or more LAGs. A packet with destination information that includes at least the identity of a physical port and a packet header parameter can be mapped determinately to a logical port associated with one particular LAG. The packet header parameter can be any one of a VLAN identity, a source or destination MAC address, and a source or destination IP address or a combination of these parameters. Defining a logical port in this manner, it is possible to assign a single physical port to two or more LAGs. By using this method, it is possible to configure a set of 'n' servers to provide 'm' services (with n and m being different numbers) and not every server provides every service.

In one embodiment, a switch or router can be configured to correctly select one or two or more LAGs over which to forward a packet by assigning two or more LAGs to a single, logical port which includes a physical port identity and one or more packet parameters that uniquely identify each of the two or more link aggregation groups, a packet received by the switch or router that includes at least one packet parameter is mapped to only one LAG assigned to the logical port, and the packet is then forwarded over at least one physical port that is a member of the link aggregation group that the packet maps to.

BRIEF DESCRIPTION OF THE DRAWINGS

Aspects of the presents disclosure are best understood from the following detailed description when read with the accompanying figures.

FIG. 7 is a diagram showing six LAG tables that can be employed in the switch embodiment of FIG. 6.

DETAILED DESCRIPTION

Figure 1:
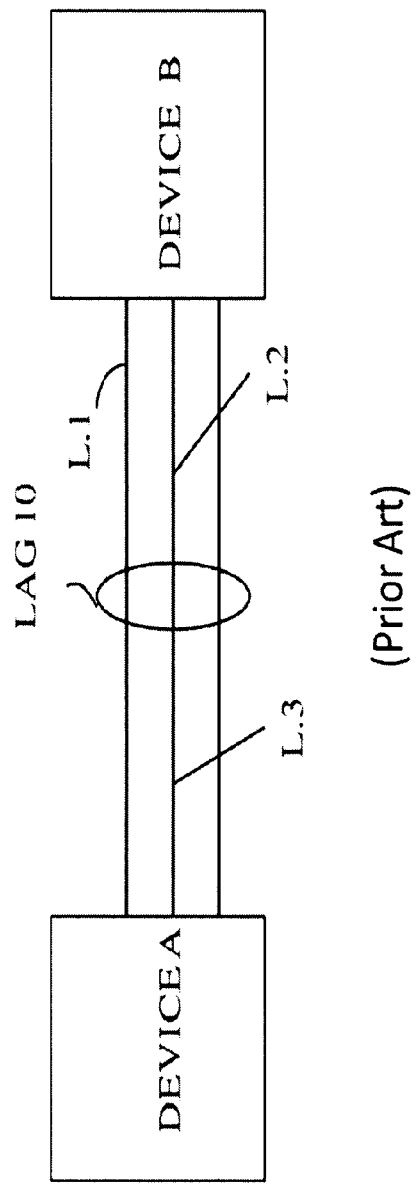
FIG. 1 is a diagram of two packet network devices in communication with each other over a LAG.
Figure 2:
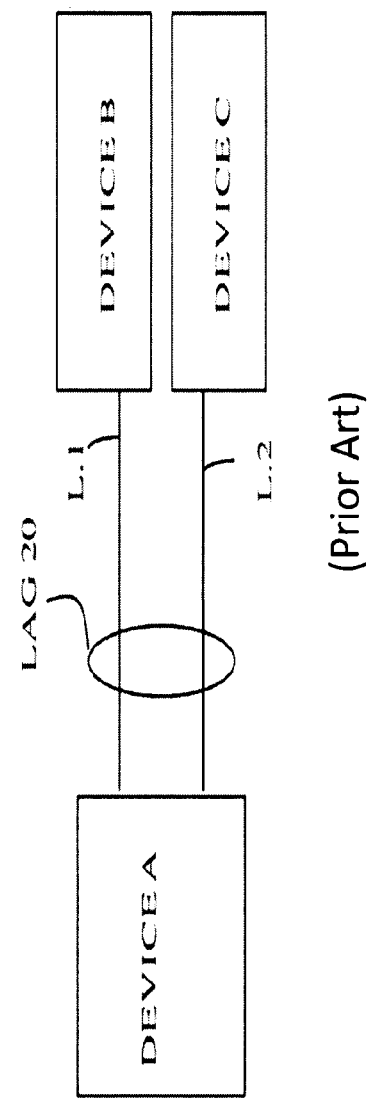
FIG. 2 is a diagram of three packet network devices illustrating load balancing over a LAG.
Figure 3:
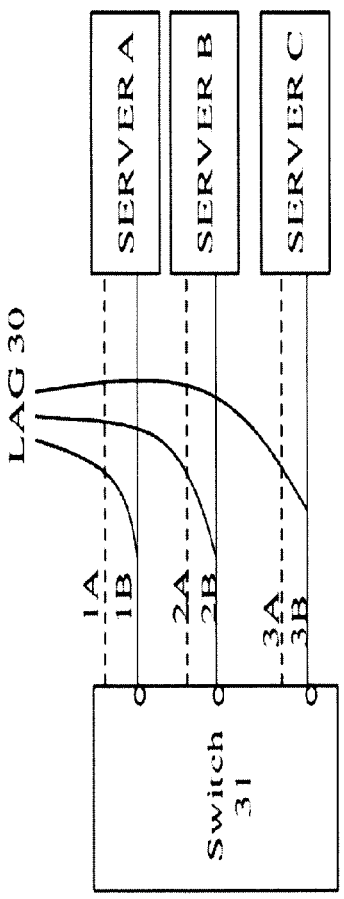
FIG. 3 is a diagram of a switch connected to three servers over a LAG that is used for load balancing.
Figure 4:
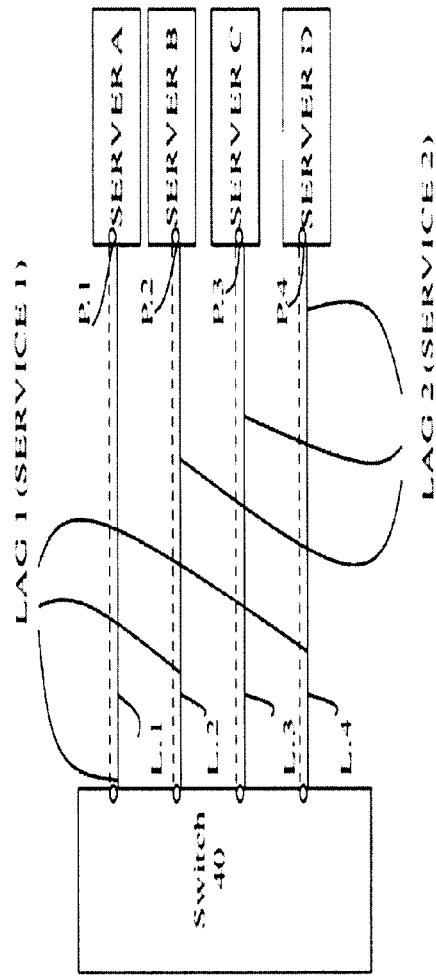
FIG. 4 is a diagram of an embodiment showing a switch and four servers which cooperate to provide two services over two LAGs.

FIG. 4 is a diagram of a network showing a switch 40 and four servers labeled Server A-Server D. The switch 40 and the four servers S.1-S.4 each include ingress/egress ports which are illustrated in the Figure by small circles. Each of the four servers are in communication with the switch 40 over one or more links, labeled links L.1, L.2, L.3 and L.4, and one end of one of each one of these links is connected to a switch 40 port and the other end of the link is connected to one of the server ports. The links generally function to conduct signals or network traffic that is transmitted between the switch and the servers. Each link can be comprised of multiple physical links or represent a single logical link, but for the purpose of this description each link (L.1-L.4) is a single logical link. Each of the servers in FIG. 4 are dual-homed devices with a first set of interfaces/ports P.1-P.4 being connected to each of the links L.1-L.4 respectively and a second set of ports (not labeled) being connected to links illustrated by dotted lines. The second set of ports (not labeled), connected to the links illustrated by dotted lines, operate to manage the server directly rather than access applications on the server. Each of the ports in the second set of ports can be configured with a unique IP address, and each port will use the regular MAC address of that interface. This interface can be used to manage and maintain the load balancing service on the these servers and also to communicate with such applications outside.

Some or all of the four servers, A-D, in FIG. 4 can be configured to cooperate to provide two services, a first service and a second service. Servers A, B and D can provide the first service and servers B, C and D can provide the second service. It should be understood that servers B and D provide both the first and second services. In order to distribute the traffic generated by these two services in a balanced manner, over all of the available links L.1-L.4, the network of FIG. 4 can be configured with two LAGs, LAG 1 and LAG 2. The first service is provided over LAG 1, which includes links L.1, L.2, L.4 and the associated ports P.1, P.2 and P.4 respectively on each of the servers, and the second service is provided over LAG 2 which includes links L.2, L.3, L.4 and the associated ports P.2, P.3 and P.4 respective on each of the servers. In order to implement such an arrangement, a first common virtual IP address and first common virtual MAC address are assigned to the ports P.1 P.2 and P.4 on servers A, B and D respectively, and a second common virtual IP address and second common virtual MAC address are assigned to the ports P.2, P.3 and P.4 on servers B, C and D respectively. Unfortunately, assigning each of the ports P.2 and P.4 with both of the first and second virtual IP and MAC addresses results in the switch 40 being unable to forward a packet, with a destination address that is either the first or the second of the virtual IP addresses, to either LAG 1 or LAG 2 in a determinate manner. However, this problem can be solved by defining a LAG to be comprised of the identity of a physical port and one or more parameters that can be included in the header of a packet. From another perspective, the combination of the physical port identify and a packet parameter defines the identify of a logical port. Each logical port can be defined to be a member of only one LAG, which in this case can be either LAG 1 or LAG 2 of FIG. 4, or from another perspective, a single, physical port can be a member of two or more LAGs. A packet with destination information that includes at least the identity of a physical port and a packet header parameter can be mapped determinately to a logical port associated with one particular LAG. The identity of a physical port and the packet header parameter can be included in a one or more LAG lookup tables that will be described later with reference to FIG. 7. The packet header parameter can be any one of a VLAN identity, a source or destination MAC address, and a source or destination IP address or a combination of these parameters. Defining a logical port in this manner, it is possible to assign a single physical port to two or more LAGs. By using this method, it is possible to configure a set of 'n' servers to provide 'm' services (with n and m being different numbers) and not every server provides every service. This permits the servers to be used more flexibly and efficiently based on the capabilities of the server and the requirement of the individual services.

Figure 5:
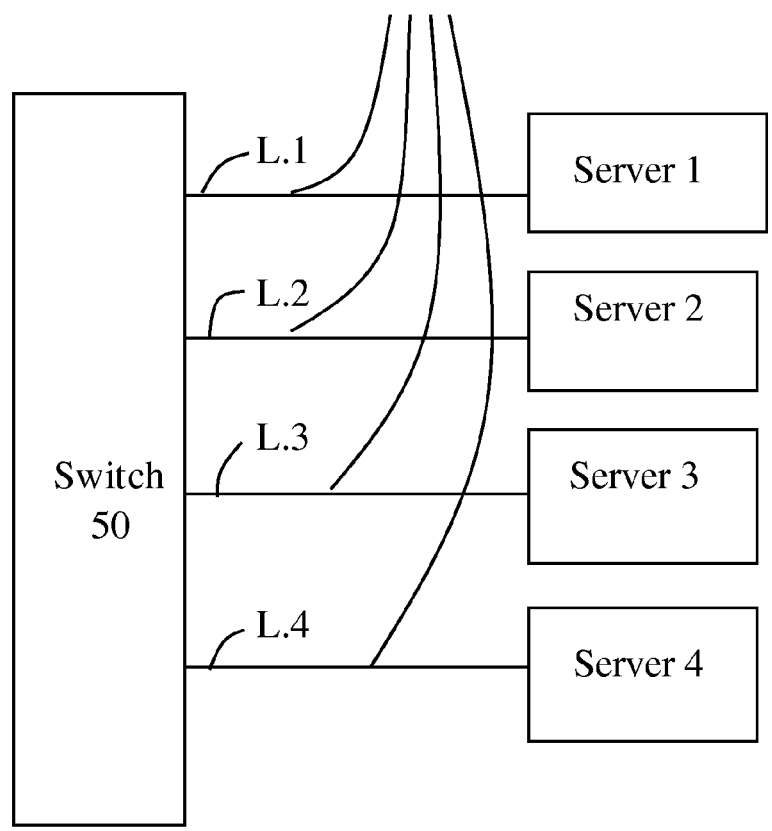
FIG. 5 is a diagram of another embodiment showing a switch and four servers which cooperated to provide two services over two LAGs.

In another embodiment, a port/protocol based LAG can be configured according to the network topology illustrated in FIG. 5. In this arrangement each of the four servers, servers 1-4, have only one interface (comprised of one or more physical ports) and need to operate each of the one or more ports in both a virtual IP mode and a management IP mode. As shown in FIG. 5, a switch 50 is connected to four servers, over a plurality of communication links, L.1-L.4. Each of the links between switch 50 and the servers are a member of a LAG 1 and a LAG2. By defining a logical port to include the identify of a physical port and a packet header parameter, each physical interface/port can be operated as two logical interfaces. Such an interface configuration is not possible with the standards based LAG approach.

Figure 6:
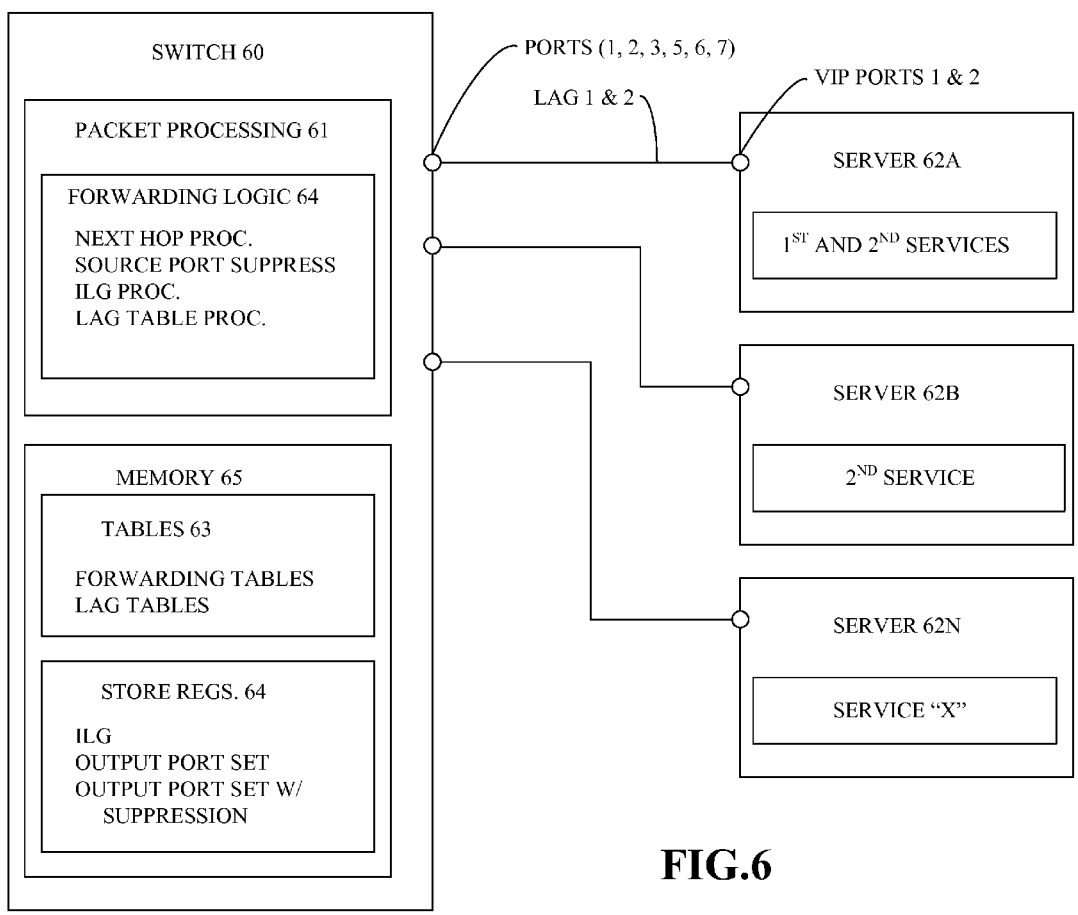
FIG. 6 is a diagram showing the functional elements that can be included in an embodiment of a switch that provides deterministic packet forwarding.

FIG. 6 is a diagram illustrating a network that includes a switch 60 and a plurality of servers 62A-62N in communication with other over one or more LAGs. Switch 60 can include one or more network interfaces each of which can include a set of ingress/egress ports that are connected to one end of a plurality of links L.1-L.n. The other end of the plurality of links are connected to ports P.1-P.n associated with servers 62A, 62B-62n. The links shown connecting switch 60 to the servers are in this case logical links. As described earlier with reference to FIG. 4, the servers can be a dual-homed devices and include two interfaces to the network. However, for the purpose of this description, only the virtual IP interface to each of the servers is shown, but it should be understood that a second management IP interface can be included in each of the servers. Each of the servers 62A-n can be configured to provide one or more services such as a domain name service (DNS), a home shopping service or any other service. In the embodiment illustrated in FIG. 6, server 62A is configured to provide two services, service-1 and service-2, and server 62B is configured to provide one service, service-2 to client devices, which clients are not shown in FIG. 6.

Continuing to refer to FIG. 6, switch 60 receives requests for the provision of the services from one or more client devices and passes these requests along to the servers 62A-n. In order to distribute the traffic generated by these two services in a balanced manner, over all of the available links L.1-L.n, the network of FIG. 6 can be configured with two LAGs, LAG 1 and LAG 2. The first service is provided over LAG 1, which is configured on the switch 60 to include ports 1, 3, 5 and 7, and the second service is provided over LAG 2, which is configured on the switch 60 to include ports 1, 2, 5 and 6. Each of one or more ports on server 62A that are associated with LAG 1 are assigned a common first virtual IP address and a common first virtual MAC address and the ports associated with LAG 1 can also be members of VLAN 10. Each of the one or more ports on server 62A that are associated with LAG 2 are assigned a second common virtual IP address and second common virtual MAC address and the ports associated with LAG 2 can also be members of VLAN 20. It should be understood that the second common virtual IP address and MAC address are different from the first virtual IP address and MAC address assigned to the server ports associated with LAG 1. It should be noted that the ports 1 and 5 on switch 60 are both members of LAG 1 and LAG 2. Given this configuration for switch ports 1 and 5, it is not possible for switch 60 to forward packets of information using either of these ports over either LAG 1 or LAG 2 in a determinate manner. Determinate in this case means that switch 60 is not able to determine on which LAG (LAG 1 or LAG 2) the packet should be transmitted. A solution to this problem is to define a logical switch port to be comprised of at least the identify of a physical switch port (switch 60 port 1 or port 5) and a packet header parameter associated with the switch port. A logical port 1 and logical port 5 are defined to be a member of only one LAG, either LAG 1 or LAG 2. So a packet that includes this logical port information (VLAN ID or virtual IP address of either LAG 1 or 2) can now be forwarded to its destination in a determinate manner.

Continuing to refer to FIG. 6, the packet processing functionality 61 included in switch 60 is comprised of packet forwarding logic, source port suppression logic, ingress LAG ID logic, output port determination logic, and LAG table logic. The packet forwarding logic operates to examine incoming packets to determine how to forward them to their proper destination. The source suppression logic operates to prevent packets, arriving at the switch 60 on a particular port, from being transmitted to their destination over this same port. Both the forwarding and suppression logic are well known to practitioners and will not be described here in any detail. The ingress LAG ID logic is employed to determine the identity of a LAG on which a packet is received by the switch, and the output port determination logic is employed to determine the identity of ports on which to transmit a packet to a next hop. And finally, the LAG table logic is employed to map LAG information included in an incoming packet to logical port information included in LAG tables stored in switch memory 65. The result of the mapping can be used to make decisions with respect to forwarding the packet to a next hop destination. Switch memory 65 generally includes table memory 63 and registers 64 for storing information generated and used by the packet processing functionality 61. The table memory 63 is comprised of standard forwarding tables and LAG tables. The forwarding tables are accessed by the packet processing function 61 in order to determine how to forward packets that arrive at the switch 60, and the LAG tables are accessed by the packet processing function to determine over which LAG, LAG 1 or LAG 2 in this case, an incoming packet should be transmitted to a destination. As mentioned above, switch memory 65 also includes registers 64 to store the identify of an ingress LAG, the identities of output ports as determined by the packet processing functionality 61 and to store the identifies of output ports after input port suppression is applied by the packet processor. A description of the use of the forwarding logic and lookup tables is undertaken later with reference to FIG. 7.

The packet processing functionality of FIG. 6 generally operates to process a packet of information as follows. The forwarding logic 64 uses the LAG table logic to examine an incoming packet for LAG identification information, and this LAG information is compared to entries in the LAG tables stored in table memory 63. If the identity of the LAG associated with the incoming packet matches information in the LAG table, the LAG ID is labeled as the ingress LAD ID (ILG). The ILG can be a set of switch 60 ports that are members of the LAG. The packet is then processed by the forwarding logic 64 (specifically by the packet destination mapping logic) in order to determine a set of output ports. Then, each of the output ports in the set of output ports are compared to the ports that are listed in the ILG, and if any ports are the same, they are removed from the set of output ports resulting in a set of output ports with source suppression. The packet is then transmitted by the switch 60 out the ports listed in the set of output ports with source suppression to the appropriate server(s), with the exception that the packet is only transmitted over one port of the set if all members of the set that are also members of the same LAG. Additionally, in order for the packet processing functionality to operate correctly for a packet destined for forwarding over a LAG identified in that LAG table, it is necessary to enhance the standard MAC discovery logic. When a packet is received on a port, it should be mapped to the LAG table as described previously. If the packet does map to any of the LAGs on a port, then the virtual MAC associated with that packet should be learnt on all of the ports assigned to the LAG and not just learned on the source port.

Referring now to FIG. 7 which illustrates the format of six LAG tables, one table for each of the logical ports 1, 2, 3, 5, 6 and 7 on switch 60 that are assigned to be members of LAG 1 and LAG 2. Each table is comprised of one or more table entries and each entry is comprised of at least two fields. The number of entries in any single table depends upon the number of LAGs that are assigned to the logical port associated with the table entry. In this case, a first field contains a VLAN ID and a second field contains a LAG ID. The switch 60 packet processing functionality examines destination address information included in an incoming packet, which can be the destination port information and/or the VLAN ID information contained in the packet header. The packet processing functionality then compares this information to information contained in each of the LAG look-up tables looking for a match which determines which LAG the packet should be transmitted over. Any matches are then stored in switch memory 65 in the ILG register. According to the LAG table format of FIG. 7, VLAN 10 is associated with switch ports assigned to LAG 1 and VLAN 20 is associated with switch ports assigned to LAG 2 (all ports are members of both VLANs). In this case, a packet coming in on port 3 with a VLAN ID of 10 matches LAG 1, and since ports 1, 3, 5 and 7 are assigned to LAG 1, these port IDs are stored in the ILG register.

Referring to the Port 1 LAG table in FIG. 7, the VLAN ID field for each entry includes information (VLAN ID) identifying a VLAN that is associated with a particular LAG, and the LAG ID field for each entry includes information that identifies the LAG (LAG 1 or LAG 2) that port 1 on switch 60 is assigned to. In this case, ports 1, 3, 5 and 7 form LAG 1 for VLAN 10 traffic and ports 1, 2, 5 and 6 form LAG 2 for VLAN 20 traffic. Note that ports 1 and 5 are members of both LAG 1 and LAG 2. In this case, the traffic on VLAN 10 is generated by service 1 and the traffic on VLAN 20 is generated by service 2, and each of the server ports can be configured to transmit and receive traffic assigned to VLAN 10 or 20.

Figure 8A:
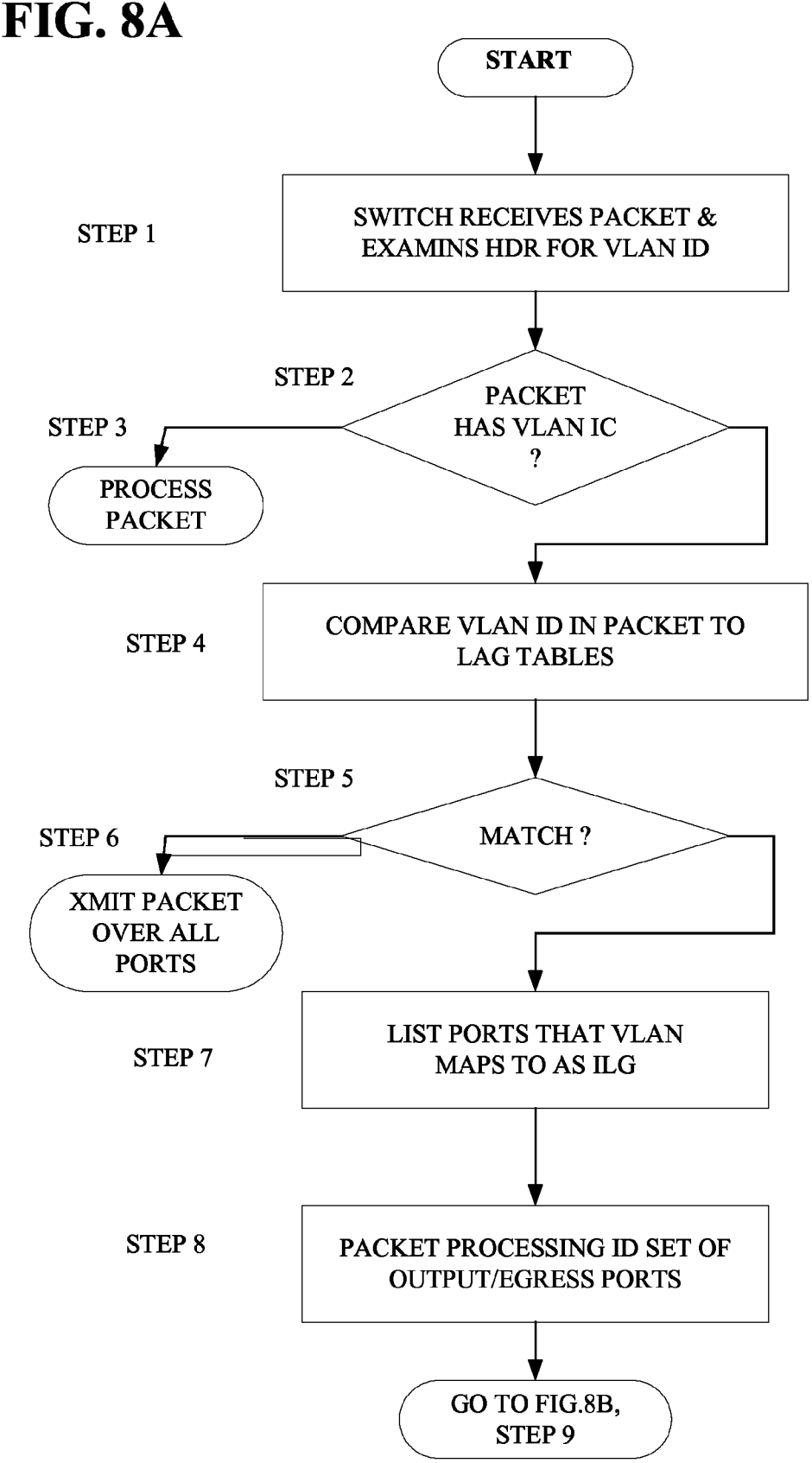
FIG. 8 is a logical flow diagram of a process that can be used to implement the deterministic packet forwarding embodiment of FIG. 6.
Figure 8B:
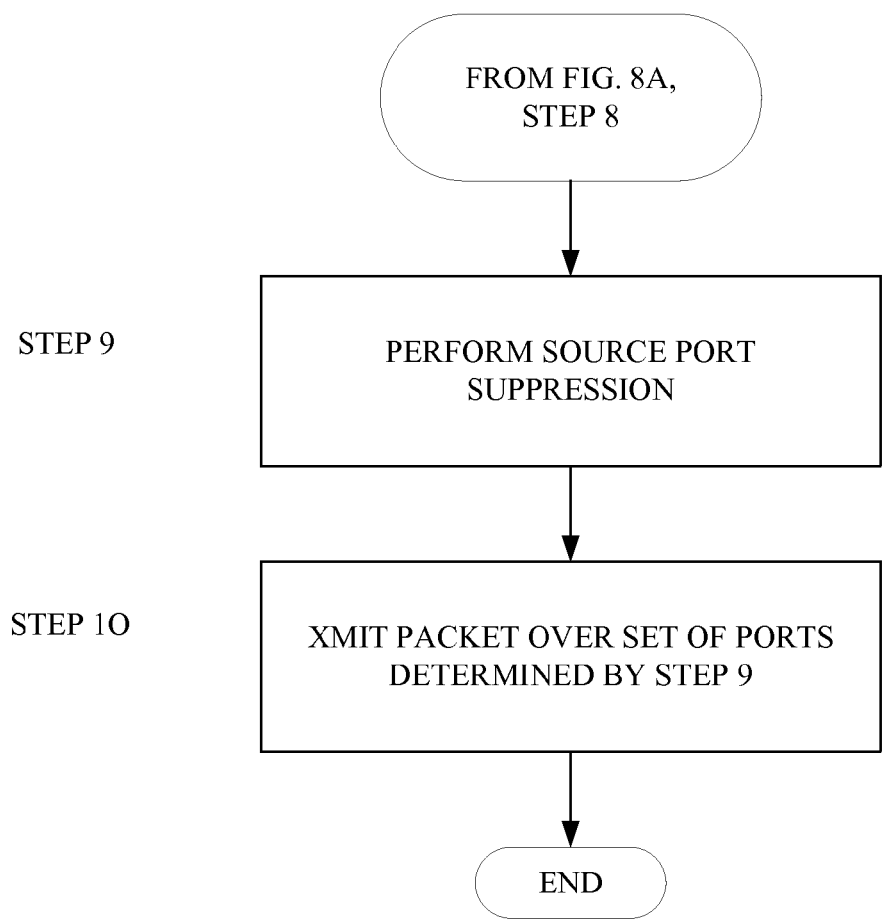

FIGS. 8A and 8*b* together represent a logical flow diagram of the process employed by switch 60 to forward a packet from the switch over either one of the two LAGs, LAG 1 or LAG 2, to a server configured to support one or both of the two services. Switch 60 is configured as was described earlier with reference to FIG. 6 with two LAGs, LAG 1 and LAG 2. The first service is provided over LAG 1 and the second service is provided over LAG 2. Virtual ports 1, 3, 5 and 7 are assigned to LAG 1, virtual ports 1, 2, 5 and 6 are assigned to LAG 2, and all of these ports (1, 2, 3, 5, 6 and 7) are members of both VLAN 10 and VLAN 20. Also, the server ports are configured with the appropriate common virtual IP and MAC addresses to support this embodiment.

In step 1 of the process of FIG. 8A, switch 60 receives a packet at an ingress port, which for the purpose of this description can be port 5, and the forwarding logic 64 in the packet processing module 61 of switch 60 examines the contents of the packet header looking for VLAN ID information. If, in step 2, the switch (packet forwarding logic 64) determines that the packet includes a VLAN ID (VLAN 10 for instance), the process proceeds to step 4, otherwise the process proceeds to step 3 and the switch processes the packet in the normal manner for transmission from the switch. At step 4 the VLAN ID detected in step 2 is compared to the contents of the LAG tables described with reference to FIG. 7, and if in step 5 the VLAN ID included in the packet maps to a VLAN ID in any of the LAG tables, then the process proceeds to step 7. In step 7 a list of the ports in the LAG that the VLAN maps to are stored in a memory register as the ILG. In this case the VLAN ID maps to LAG 1 which corresponds to ports 1, 3, 5 and 7 and so the identify of these ports are stored in the ILG register. On the other hand, if in step 5 the VLAN ID does not map to any information included in the LAG tables, then the process proceeds to step 6 and the switch 60 transmits the packet out all of the ports 1, 2, 3, 5, 6 and 7. Proceeding to step 8, the forwarding logic 64 in switch 60 operates to determine on which ports the packet should egress, and in this case since the packet is to be transmitted over all ports assigned to VLAN 10 (which are ports 1, 2, 3, 5, 6, and 7). These port identified are stored in the output port set register in switch memory 65. Referring to step 9 of FIG. 8B, the forwarding logic 64 performs source port suppression, which has the effect of removing port 5 (because this is the ingress port) and ports 1, 3 and 7 because they are member of LAG 1 (the LAG the packet maps to) from the set of egress ports stored in step 8. The resulting set of ports is stored in the memory register as the set of egress ports with suppression which in this case are ports 2 and 6. In step 10, the switch 60 proceeds to forward the packet received in step 1 over each of the ports stored in the egress port list with suppression.

The forgoing description, for purposes of explanation, used specific nomenclature to provide a thorough understanding of the invention. However, it will be apparent to one skilled in the art that specific details are not required in order to practice the invention. Thus, the forgoing descriptions of specific embodiments of the invention are presented for purposes of illustration and description. They are not intended to be exhaustive or to limit the invention to the precise forms disclosed; obviously, many modifications and variations are possible in view of the above teachings. The embodiments were chosen and described in order to best explain the principles of the invention and its practical applications, they thereby enable others skilled in the art to best utilize the invention and various embodiments with various modifications as are suited to the particular use contemplated. It is intended that the following claims and their equivalents define the scope of the invention.

I claim:

1. A method of operating a packet network device, comprising:

assigning a single, logical port to each of a plurality of link aggregation groups, wherein each of the plurality of link aggregation groups are associated with at least one of a plurality of physical ports, and a first physical port of the plurality of physical ports is associated with at least two of the plurality of link aggregation groups;

receiving a packet at the first physical port that includes at least one packet parameter;

determining, using an identity of the first physical port and the at least one packet parameter included in the packet, a first logical port associated with a first link aggregation group of the at least two of the plurality of link aggregation groups that are associated with the first physical port; and forwarding the packet over at least one of the plurality of physical ports that is associated with the first link aggregation group that is assigned to the first logical port.

2. The method of claim 1, wherein the single, logical port comprises a physical port identity and one or more packet parameters that uniquely define each of the plurality of link aggregation groups.

3. The method of claim 1, wherein the method is performed by one of a network switch and a network router.

4. The method of claim 1, wherein each of the plurality of link aggregation groups is an aggregation of one or more egress ports on a packet network device.

5. The method of claim 1, wherein the at least one packet parameter includes one or more of a virtual LAN identity, a source or destination IP address, and a source or destination MAC address.

6. The method of claim 1, further comprising:
mapping the at least one packet parameter to the first logical port associated with the first link aggregation group by comparing the identity of the first physical port and the at least one packet parameter to at least one link aggregation group (LAG) table.

7. The method of claim 6, wherein each at least one LAG table is comprised of one or more table entries.

8. The method of claim 7, wherein each of the one or more table entries is comprised of a physical port identity, at least one packet parameter, and a LAG identity.

9. A method of forwarding a packet, comprising:
receiving a packet at a first physical port of a packet network device;
examining a packet header in the packet to determine at least one packet parameter that, along with an identity of the first physical port, identifies a logical port that is unique to one of a plurality of link aggregation groups that are each associated with a plurality of physical ports, wherein the first physical port of the plurality of physical ports is associated with at least two of the plurality of link aggregation groups;
determining, using the identity of the first physical port and the at least one packet parameter, a first link aggregation group of the at least two of the plurality of link aggregation groups that are associated with the first physical port;
identifying a subset of the plurality of physical ports that are associated with the first link aggregation group; and
forwarding the packet over the subset of the plurality of physical ports.

10. The method of claim 9, wherein the logical port comprises a physical port identity and one or more packet parameters that uniquely define each of the plurality of link aggregation groups.

11. The method of claim 9 wherein the packet network device is a network switch or a network router.

12. The method of claim 9 wherein the each of the link aggregation groups is an aggregation of one or more egress ports on the packet network device.

13. The method of claim 9 wherein the at least one packet parameter is one or more of a virtual LAN identity, a source or destination IP address, and a source or destination MAC address.

14. The method of claim 9 further comprising:
comparing the identity of the first physical port and the at least one packet parameter to at least one LAG table.

15. The method of claim 14 wherein each of the at least one LAG table is comprised of one or more table entries.

16. A packet network device, comprising:
a plurality of physical ports;
a packet processor coupled to the plurality of physical ports; and
a memory coupled to the packet processor and storing one or more forwarding tables and one or more link aggregation group tables, wherein the memory includes instructions that, when executed by the packet processor, cause the packet processor to:
examine a packet header from a packet that is received at a first physical port of the plurality of physical ports to determine at least one packet parameter, wherein of the first physical port of the plurality of physical ports is associated with a plurality of link aggregation groups;
determine, using an identity of the first physical port, the at least one packet parameter, and the one or more link aggregation group tables, a first link aggregation group of the plurality of link aggregation groups that are associated with the first physical port;
identify a subset of the plurality of physical ports that are associated with the first link aggregation group using the one or more link aggregation group tables; and
forward the packet over at least one of the subset of the plurality of physical ports using the one or more forwarding tables.

17. The packet network device of claim 16, wherein the plurality of physical ports, the packet processor, and the memory are provided on a network switch or a network router.

18. The packet network device of claim 16, wherein the first link aggregation group is comprised of the first physical port and one or more of the other of the plurality of physical ports.

19. The packet network device of claim 16, wherein the one or more link aggregation group tables are comprised of one or more table entries.

20. The packet network device of claim 19, wherein each of the one or more table entries is comprised of a physical port identity, at least one packet parameter, and a LAG identity.

* * * * *